US011606818B2

(12) United States Patent
Barber

(10) Patent No.: US 11,606,818 B2
(45) Date of Patent: Mar. 14, 2023

(54) WIRELESS CONTENTION REDUCTION

(71) Applicant: Cisco Technology, Inc., San Jose, CA (US)

(72) Inventor: Simon Barber, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 16/779,006

(22) Filed: Jan. 31, 2020

(65) Prior Publication Data

US 2020/0170042 A1 May 28, 2020

Related U.S. Application Data

(63) Continuation of application No. 15/646,974, filed on Jul. 11, 2017, now Pat. No. 10,555,341.

(51) Int. Cl.
*H04W 74/08* (2009.01)
*H04L 69/16* (2022.01)
*H04W 84/12* (2009.01)

(52) U.S. Cl.
CPC ......... *H04W 74/0816* (2013.01); *H04L 69/16* (2013.01); *H04W 84/12* (2013.01)

(58) Field of Classification Search
CPC .............................................. H04W 74/0816
See application file for complete search history.

(56) References Cited

U.S. PATENT DOCUMENTS

| 4,236,068 A | 11/1980 | Walton |
| 5,642,303 A | 6/1997 | Small et al. |
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |

(Continued)

FOREIGN PATENT DOCUMENTS

| WO | WO 2013/020126 | 2/2013 |
| WO | WO 2014/098556 | 6/2014 |
| WO | WO 2018/009340 | 1/2018 |

OTHER PUBLICATIONS

"I Love WiFi, The difference between L2 and L3 Roaming Events," Apr. 1, 2010, 6 pages.

(Continued)

*Primary Examiner* — Kevin M Cunningham
(74) *Attorney, Agent, or Firm* — Polsinelli

(57) ABSTRACT

The subject disclosure relates to a computer-implemented method for reducing access contention in a wireless medium. In some aspects, a method of the technology includes steps for exchanging data packets with multiple client devices in a wireless network, and based on the data exchange, identifying a first device from among the multiple client devices for which one or more higher-layer (e.g., Layer 3 and/or Layer 4) packets are likely to be received. In some aspects, a method of the technology can further include steps for broadcasting a lower-layer (e.g., Layer 2) packet to the plurality of client devices, wherein the lower-layer packet includes an extended duration field to suppress transmission by one or more listening client devices until at least one subsequent higher-layer packet is received from the first device. Systems and machine-readable media are also provided.

19 Claims, 4 Drawing Sheets

(56) References Cited

U.S. PATENT DOCUMENTS

| | | | |
|---|---|---|---|
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,391,836 B1 | 3/2013 | Bolot et al. |
| 8,396,485 B2 | 3/2013 | Grainger et al. |
| 8,446,899 B2 | 5/2013 | Lei et al. |
| 8,458,184 B2 | 6/2013 | Dorogusker et al. |
| D691,636 S | 10/2013 | Bunton |
| 8,549,638 B2 | 10/2013 | Aziz |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| D757,424 S | 5/2016 | Phillips et al. |
| D759,639 S | 6/2016 | Moon et al. |
| 9,389,992 B2 | 7/2016 | Gataullin et al. |
| 9,426,305 B2 | 8/2016 | De Foy et al. |
| D767,548 S | 9/2016 | Snyder et al. |
| D776,634 S | 1/2017 | Lee et al. |
| 9,544,337 B2 | 1/2017 | Eswara et al. |
| 9,609,504 B2 | 3/2017 | Karlqvist et al. |
| 9,642,167 B1 | 5/2017 | Snyder et al. |
| 9,654,344 B2 | 5/2017 | Chan et al. |
| 9,713,114 B2 | 7/2017 | Yu |
| 9,772,927 B2 | 9/2017 | Gounares et al. |
| 9,820,105 B2 | 11/2017 | Snyder et al. |
| D804,450 S | 12/2017 | Speil et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0183443 A1 | 8/2007 | Won |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0182867 A1 | 7/2012 | Farrag et al. |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0044607 A1* | 2/2013 | Liu ................. H04W 8/26 370/242 |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0275206 A1 | 10/2013 | Shekhawat |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0004865 A1 | 1/2014 | Bhargava et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0071270 A1 | 3/2015 | Harel et al. |
| 2015/0087330 A1 | 3/2015 | Prechner et al. |
| 2015/0103818 A1 | 4/2015 | Kuhn et al. |
| 2015/0117269 A1 | 4/2015 | Navalekar et al. |
| 2015/0163192 A1 | 6/2015 | Jain et al. |
| 2015/0172025 A1 | 6/2015 | Kwon et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |

(56) References Cited

U.S. PATENT DOCUMENTS

| | | | |
|---|---|---|---|
| 2015/0373642 A1* | 12/2015 | Wong | H04L 49/201 370/311 |
| 2016/0007315 A1 | 1/2016 | Lundgreen et al. | |
| 2016/0021669 A1 | 1/2016 | Tetzlaff et al. | |
| 2016/0044627 A1 | 2/2016 | Aggarwal et al. | |
| 2016/0099847 A1 | 4/2016 | Melander et al. | |
| 2016/0105408 A1 | 4/2016 | Cooper et al. | |
| 2016/0113031 A1 | 4/2016 | Sun et al. | |
| 2016/0127875 A1 | 5/2016 | Zampini, II | |
| 2016/0146495 A1 | 5/2016 | Malve et al. | |
| 2016/0344641 A1 | 11/2016 | Javidi et al. | |
| 2016/0352492 A1 | 12/2016 | De Wit et al. | |
| 2017/0026974 A1 | 1/2017 | Dey et al. | |
| 2017/0214551 A1 | 7/2017 | Chan et al. | |
| 2018/0069311 A1 | 3/2018 | Pallas et al. | |
| 2018/0084389 A1 | 3/2018 | Snyder et al. | |
| 2018/0322403 A1* | 11/2018 | Ron | G06N 3/08 |

OTHER PUBLICATIONS

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp. 171-175.

Carter, Steve Sr., "E911 VoIP Essentials For Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco ASR 5x00 Mobility Management Entity Administration Guide, Version 15.0, Last updated Jun. 13, 2014, Cisco, 1-266.

Cisco Systems, Inc., "Wi-Fi Location-Based Services 4.1 Design Guide," May 20, 2008, 206 pages.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012), pp. 101-108.

Geller, Michael, et al., "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways To De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

* cited by examiner

WIRELESS CONTENTION REDUCTION

CROSS-REFERENCE TO RELATED APPLICATION

This application is a Continuation of, and claims priority to, U.S. Non-provisional patent application Ser. No. 15/646,974, filed Jul. 11, 2017, which is incorporated herein by reference in its entirety.

BACKGROUND

1. Technical Field

The subject technology provides solutions for reducing contention in a wireless network, and in particular for reducing wireless contention caused during exchange of Layer 3 and Layer 4 acknowledgement traffic.

2. Introduction

Many wireless local area network (WLAN) deployments are based upon the IEEE 802.11 standards that provide protocols to enable access between mobile devices, and to other networks, such as hard-wired local area and global networks, such as the Internet. In receiving Internet data, a common gateway operating in a conventional IP/TCP protocol may be utilized. The IEEE 802.11 architecture is comprised of several components and services that interact to provide station mobility transparent to higher layers of the network stack. IEEE 802.11 based networks define stations as components that connect to a wireless medium and contain the functionality of the IEEE 802.11 protocols, for example, including MAC (Medium Access Control), PHY (Physical Layer), and connections to the wireless media. Typically, IEEE 802.11 protocols are implemented in the hardware and/or software of a network interface card.

IEEE 802.11 standards also define a Basic Service Set or BSS, which is regarded as a basic building block in WLAN architecture. The BSS consists of a group of access point stations that communicate with one another. In independent BSS, the mobile stations communicate directly with each other. In an infrastructure BSS, all stations in the BSS communicate with the access point and no longer communicate directly with the independent BSS, such that all frames are relayed between stations by the access point.

A station could be a laptop PC, handheld device, or an access point (referred herein as "access point" or "AP"). Stations can be mobile, portable, or stationary, and all stations support the IEEE 802.11 station services of authentication, de-authentication, privacy, and data delivery. The MAC layer's primary function is to provide a fair mechanism to control access of shared wireless media. However, prior to transmitting a frame, the MAC layer must gain access to the network, which it does through two different access mechanisms: a contention-based mechanism, called the distributed coordination function (DCF), and a centrally controlled access mechanism, called the point coordination function (PCF). The PCF modes allow the implementation of a quality of service (QOS) mechanism, but it is optional and requires extra interactions in order to negotiate a QOS between the mobile terminal and the AP. The DCF mode, considered the default mode, does not provide any QOS mechanism. Consequently all stations including the base station AP in WLAN have the same probability to acquire and to send data within the medium. This type of service is referred to as a "best effort."

BRIEF DESCRIPTION OF THE DRAWINGS

Certain features of the disclosed technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
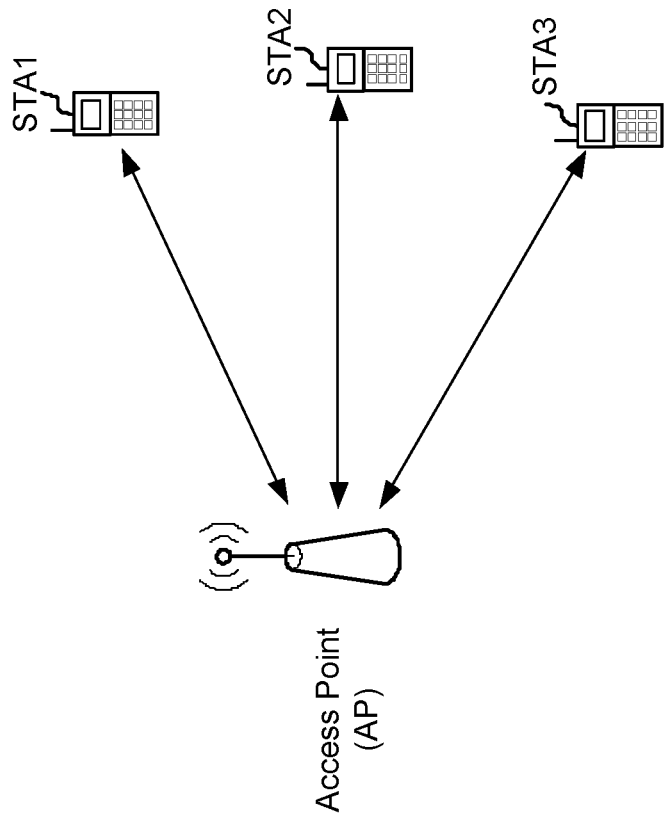
FIG. 1 illustrates an example wireless communication network in which some aspects of the technology can be implemented.

The detailed description set forth below is intended as a description of various configurations of the technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

The subject disclosure relates to systems and methods for reducing access contention and the resultant collisions in a wireless network. In some aspects, a method or process of the technology includes steps for exchanging data packets with multiple client devices in a wireless network, and based on the data exchange, identifying a first client device and anticipating transmission of a packet based on information about layer 4 (or above) protocols. The method can further include steps for broadcasting a Layer 2 packet to the client devices, wherein the Layer 2 packet includes a duration field having an extended duration value, configured to suppress transmission by other listening client devices, allowing one or more anticipated packets to be received from the first client device without contention or collision from the other client devices.

Description

A wireless local area network (WLAN) system works in an unauthorized spectrum shared by multiple users on a channel. If multiple client/receiver devices send data at the same time, the transmitted data packets can interfere, causing a collision. Therefore, in WLAN systems, a carrier sense multiple access with collision avoidance (CSMA/CA) mechanism is used to avoid a collision.

Carrier sense (CS) indicates that: before sending a frame, any device connected to a medium needs to sense the medium, and only when it is determined that the medium is idle, can the device can send the frame. Multiple Access (MA) provides that multiple devices can access a medium at the same time, and a frame sent by one device may also be received by multiple devices. A working manner of the CSMA/CA mechanism is that when a device intends to send a frame and obtains (by means of sensing) that a channel is idle, after the channel remains idle for a time period, if the channel is still idle after the device waits for another random time period (e.g., a "backoff period"), the device submits data. Because a waiting time of each device is generated randomly, it is likely that there is a difference, so that a possibility of collision can be reduced. Thus, a probability of a collision is related to how busy a system is. However, in WLAN systems, there is a "hidden node" problem. That is, when an access point (AP), e.g., "AP1" sends data to a receiver station (STA), a station that fails to sense AP1 (e.g., AP2), may consider the channel to be idle and start to send data, thereby interfering with a receiving device STA. This problem cannot be fully resolved by using the CSMA/CA protocol.

Because of the hidden node problem, in the WLAN system, the request to send (Request to send, RTS)/clear to send (Clear to send, CTS) protocol is generally used to perform transmission protection. Using RTS/CTS a channel is reserved before data is sent. For example, when AP1 sends data to STA, AP2 can also perform sending, thereby interfering with receiving of the STA transmission. However, the RTS/CTS protocol requires that, before sending data, AP1 first sends an RTS frame, and the receiving STA returns a CTS frame after receiving the RTS frame. All APs or STAs, except the intended recipient, receiving the RTS or CTS frame, set a network allocation vector (Network Allocation Vector, NAV) according to an indication of the received RTS or CIS frame (i.e., a "duration field"), where the NAV is a time corresponding to a sending time required by the AP1. These APs or STAs cannot send data within the NAV time. After sending an RTS (Layer 2) frame and receiving a response of the STA e.g., a CTS indication, AP1 obtains a sending opportunity, and AP1 sends data to the STA within this time period, which is not interfered with by other nearby APs or STAs.

In many WLAN implementations, the vast majority of data traffic is TCP/IP traffic. In such instances, Layer 4 acknowledgements are typically sent by the STA a short period after the Layer 4 data is received, and outside of the time period protected by the NAV as set by the transmission of the Layer 4 data. As a result, a large proportion of wireless contention occurs between multiple different STAs transmissions of Layer 4 ACKs. This problem is exacerbated when the STAs have poor antennas relative to the AP. For instance if the AP is mounted high up in a stadium, with a high gain antenna, and the STAs are mobile devices, low down in a crowd of people, with a low gain antenna, then the STAs may be hidden from each other, but not from the AP.

Aspects of the technology resolve the problems of wireless contention caused before and/or during issuance of Layer 3/4 acknowledgements by a receiving STA (e.g., TCP ACKs), through the extension of the duration field until a point in time, before which, the anticipated higher layer responses or other traffic are received by the AP.

FIG. 1 illustrates an example wireless communication network 100 in which some aspects of the technology can be implemented. FIG. 1 illustrates an Access Point (AP), configured for wireless communication with multiple receivers or client devices (e.g., STA1, STA2, and STA3). It is understood that additional (or fewer) STAs and/or APs could be implemented in network 100, without departing from the scope of the technology.

The AP may have access or interface to a Distribution System (DS) or another type of wired/wireless network that may carry traffic in and out of a BSS (not illustrated). Thus traffic to STAs can originate from outside the BSS, and arrive through the AP for delivery to the STAs. Conversely, traffic originating from STAs to destinations outside the BSS can be sent to the AP to be delivered to the respective destinations. Traffic between STAs within the BSS can be sent through the AP where the source STA may send traffic to the AP and the AP may deliver the traffic to the destination STA. The traffic between STAs within a BSS may be peer-to-peer traffic.

Using the IEEE 802.11 infrastructure mode of operation, the AP can transmit on a fixed channel, for example that is 20 MHz wide, and designated as the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, can sense the primary channel. If the channel is detected to be busy, the STA may back off. If the channel is detected to be free, the STA may acquire the channel and transmit data.

It is understood that network 100 can implement various wireless standards using different channel sizes (bandwidths), without departing from the technology. By way of example, IEEE 802.11n, High Throughput (HT) STAs may be used, e.g., implementing a 40 MHz communication channel. This can be achieved, for example, by combining a primary 20 MHz channel, with an adjacent 20 MHz channel to form a 40 MHz wide contiguous channel. In IEEE 802.11a/c, very high throughput (VHT) STAs can also be supported, e.g., 20 MHz, 40 MHz, 80 MHz, and/or 160 MHz wide channels. The 40 MHz, and 80 MHz, channels can be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration).

Additionally, although several of the examples provided describe wireless contention reduction in the context of an 802.11 WLAN architecture, is understood that other protocols can be implemented without departing from the technology. That is, wireless contention reduction techniques can be implemented in virtually any infrastructural context in which manipulation of an extension field duration (e.g. provided in a Layer 2 packet), is based on expectations of higher layer packet receipt (e.g., of Layer 3 or 4 packets or TCP/IP ACKs).

In practice, wireless contention between AP1, STA1, STA2, and STA3, can be reduced by the extension of the 802.11 duration field transmitted by AP1. For example, with respect to example network 100, AP1 can be configured to determine a likelihood that Layer 3 or Layer 4 packets are provided in response to any data transmitted to any of the network receivers (e.g., STA1, STA2, and STA3).

Data exchange between AP1 and any (or all) of the receivers in network 100 can be used to determine (at AP1), the likelihood of the subsequent receipt of higher layer responses or other transmissions, such as TCP ACKs. Based on the anticipated receipt of higher layer traffic, AP1 can adjust a duration field (e.g., indicated in a RTS frame or another frame), used to initiate transfer to any of the receiving STAs (i.e. where the receiver address is that of the receiving STA). The extended duration field value can be commensurate with a predicted time duration necessary for AP1 to receive all potentially inbound anticipated traffic, and complete the TXOP (e.g. subsequent L2 ACK or Block ACK). As discussed above, by increasing the duration field, wireless contention between STAs (STA1, STA2, STA3) and AP1, can be reduced by suppressing packet transmission by non-participating STAs until a full TCP transfer between AP1 and the receiving STA has completed.

By way of example, before initiating a data transfer to STA1, AP1 can predict that a response from STA1 will include Layer 3 and Layer 4 traffic. In particular, AP1 can determine the likelihood that STA1's response includes one or more TCP ACK packets, and the timing of when those are expected. As discussed in further detail below, the determination of the response type provided STA1 can be based on any of a variety of network observations. By way of example, the prediction can be based on a history of packet exchange between AP1 and STA1, a history of data packet exchange between AP1 and one or more nodes similar to STA1, and/or based on a type of data transferred from AP1 to STA1 (e.g., voice-over IP traffic), etc. In some aspects, machine-learning approaches can be implemented, for example, to predict or model the response types and/or durations for STA replies to AP1 transfers, based on dynamic network observations.

After AP1 has determined that subsequent STA1 responses are likely to include TCP/IP ACKs, adjustment of the duration is performed to extend the duration to at least a time necessary for AP1 to receive any subsequent TCP/IP ACKs, or the time for the anticipated response can be reserved later on by scheduling transmission of a frame to the client, e.g., if the delay is large and other transmissions are available to fill in the time. As such, the frame received by the other STAs in network 100 signals that the wireless medium is not available for transfer (e.g., to STA2, and STA3), until after expiration of the time period indicated by the extended duration field value. Transmission suppression of other receivers in network 100 is ended after this expiration.

As discussed in further detail below, extension field duration can also take consideration of the time required to perform batch data transmission, e.g., by an AP to a given STA, as well as the expected batch receipt of multiple TCP ACKs.

Figure 2A:
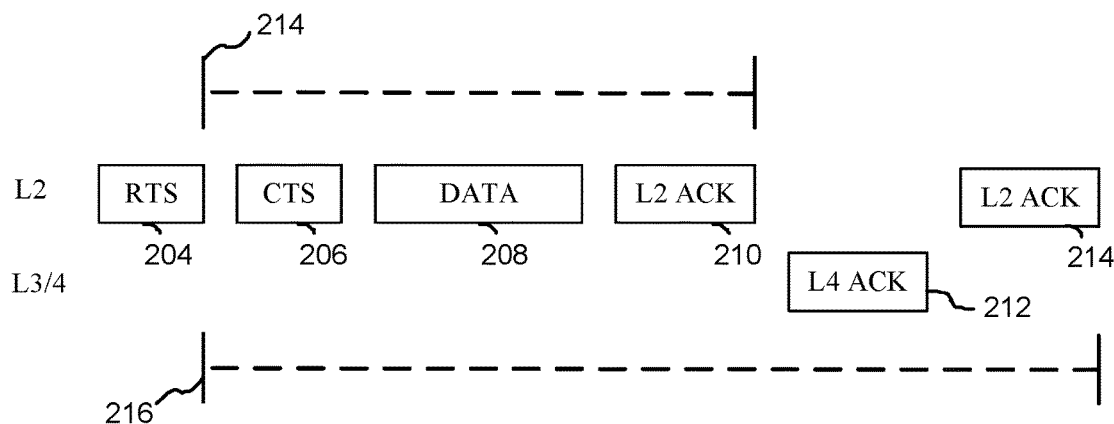
FIG. 2A conceptually illustrates a timing specified by an extended duration field value configured in accordance with some aspects of the technology.

FIG. 2A graphically illustrates timing differences between a wireless medium reservation time specified by a standard duration field 214, and that of a configured (extended) value provide in extended duration field 216 of the subject technology. As illustrated, Layer 2 (L2) packets include a RTS packet 204, CTS packet 206, and L2 acknowledgement (ACK) 210, and L2 acknowledgement ACK 213. Layer 3/4 (L3/4) response packets include data 208, and L4 ACK 212. As used in the example of FIG. 2A, L4 ACK 212 represents one or more TCP/IP ACK/s. However, it is understood that L4 ACK 212 can represent any packet transmitted on a higher layer (e.g., Layer 3 or 4) in immediate or anticipated response to a lower layer (e.g. L2) data transmission.

In practice, RTS 204 is initially broadcast by a transmitting AP, such as AP1 discussed above. RTS 204 includes an extended duration field value that indicates an extended time duration for which all non-recipient receiver nodes (e.g., non-receiving STAs) must wait before resuming wireless contention. The intended recipient node, however, is permitted to respond, e.g., by sending back a "clear to send" (CTS) packet 206.

Subsequent transmission of data by the access point to the intended receiver can include the transfer of data packets 208, followed by the receipt of one or more L2 ACKs 210. Subsequently, one or more higher-layer packets (e.g., L3/4 ACKs) 212 are received by the receiver and acknowledged with L2 ACK 213, after which the time period specified by the extended duration field value expires, permitting other nodes in the network to begin the process of contention.

It is understood that any of data packet/s 208, L2 ACKs 210, 213, and/or L3/4 ACK/s 212 can represent batch packet transfers. For example, data packet 208 can represent a stream of packets transmitted from an AP (e.g., AP1), to a designated receiver (e.g., STA1). Similarly, ACKs 212 can represent a batch of TCP/IP acknowledgements sent from the designated receiver back to the AP. As such, the extended duration value 216 specified in the duration field of RTS 204 can be sufficient to account for an end-to-end time needed to complete a batch transfer of data packets or several batches, and a batch receipt of (TCP/IP) acknowledgement packets, by the AP.

Figure 2B:
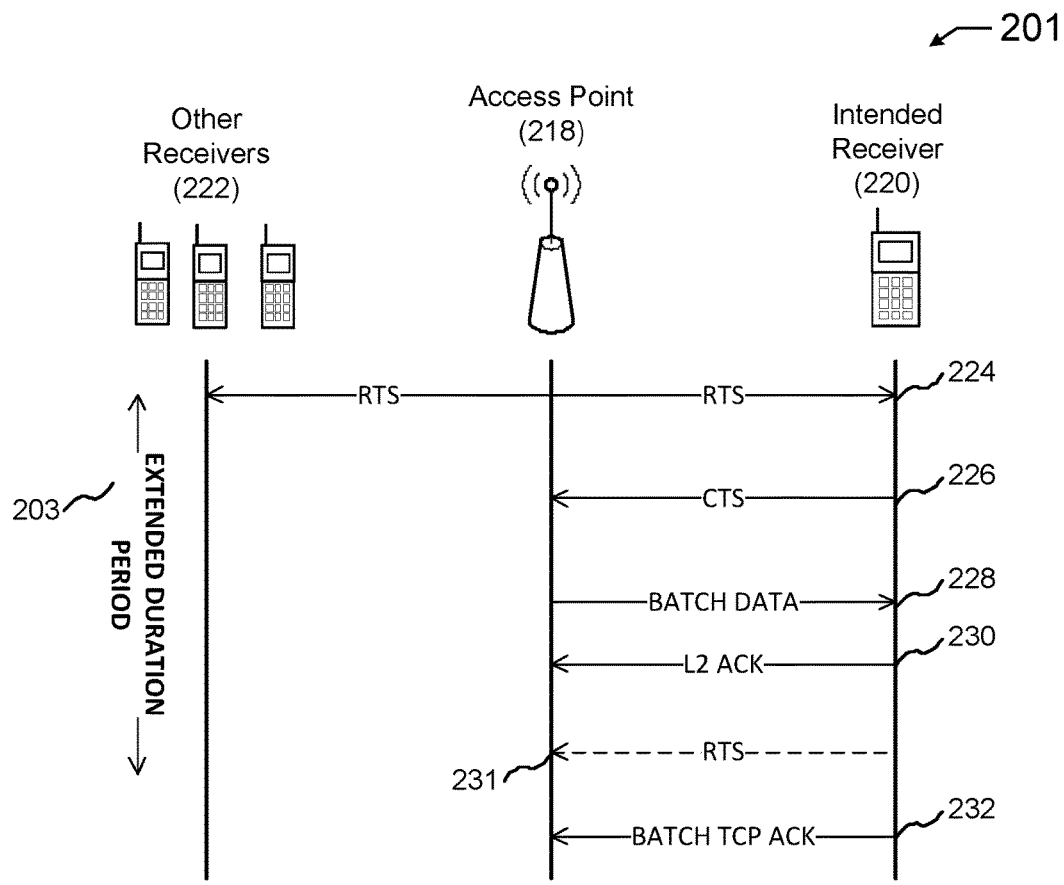
FIG. 2B provides a communication timing diagram graphically illustrating an example chronology of communications between an access point (AP), and a variety of receivers, according to some aspects of the technology.

FIG. 2B provides a communication timing diagram 201, graphically illustrating an example chronology of communications between an access point, and a variety or receivers, according to some aspects of the technology. Timing diagram 201 illustrates a chronology of data exchanged between Access Point (AP) 218, intended receiver 220, and multiple other receivers 222 in a wireless network environment. For simplicity sake, diagram 201 indicates signaling between transmitting and intended recipient devices. As understood by one of skill in the art, wireless transmissions can be received by any device in the broadcast range.

In the provided example, AP 218 initially broadcasts an RTS packet 224, which is received by Intended Receiver 220, as well as one or more other receivers 222. In accordance with aspects of the disclosed technology, RTS packet 224 includes an extended duration field value 203 calibrated based on a time period 203 required for AP 218 to receive one or more Layer 4 acknowledgement packets (ACKs) from Intended Receiver 220. Each of the non-intended receivers in the network (e.g., Other Receivers 222), are silenced for the time period 203 indicated by the extended duration field value in RTS packet 224. Intended Receiver 220, however, is permitted to transmit, and subsequently issues CTS packet 226 back to AP 218.

Subsequently, AP 218 can transfer a batch of data packets 228 to Intended Receiver 220. In some implementations, each separate packet transferred in batch 228 can precipitate a Layer 2 acknowledgement (e.g., L2 ACK 230) that is issued from Intended Receiver 220. Subsequently, one or more batches of Layer 3 acknowledgements (e.g., Batch TCP ACK 232), can be transmitted from Intended Receiver 220 to Access Point 218. In some approaches, TCP/IP ACKs are provided for every other data packet in batch 228. However, Layer 4 ACKs can be provided on a more (or less) frequent basis, without deviating from the scope of the technology.

In some implementations, Intended Receiver 220 may send an optional RTS 231 to AP 218, e.g., before transmission of the Batch TCP ACK 232. It is understood that wireless broadcasts can be received by each device in the wireless network; however, the illustration of FIG. 2B illustrates only intended recipients of broadcasts by each device.

By extending the duration field indicated in the RTS packet (e.g., RTS 224), until all anticipated Layer 4 acknowledgements have been received and acknowledged at L2, wireless contentions that would have occurred just after issuance of the L2 ACK 230 are eliminated.

Figure 3:
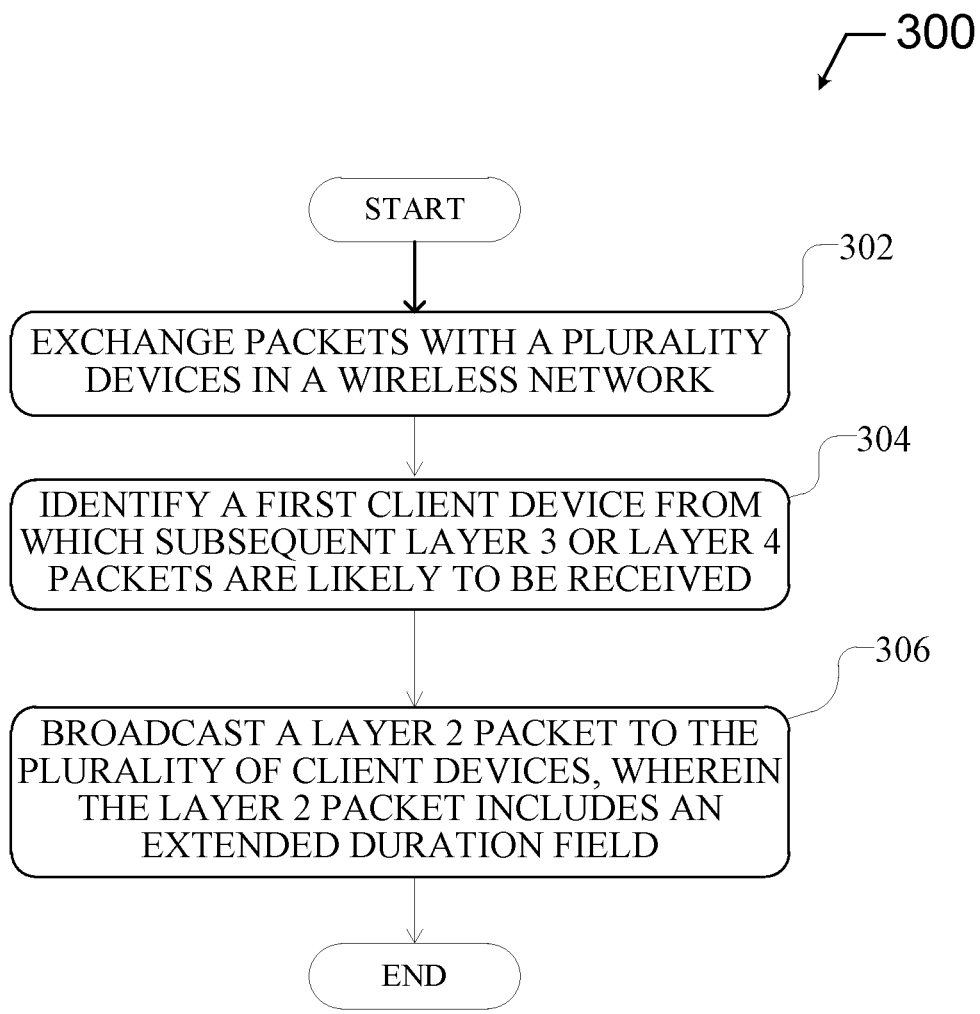
FIG. 3 illustrates steps of an example process for reducing wireless contention, according to some aspects of the technology.

FIG. 3 illustrates steps of an example process 300 for reducing wireless contention, according to some aspects of the technology. Process 300 begins with step 302 in which a multitude of packets are exchanged (e.g., by an access point), with a plurality of devices (receivers/STAs) in a wireless network. As indicated above, the provided examples are described in the context of 802.11 wireless network implementations. However, other protocols can be used, without departing from the technology.

In some aspects, the exchange of packets with one or more devices in the wireless network can be used as an opportunity for the AP to "learn" about the type of packets transacted with one or more nodes in a network. The AP can be configured to inspect packets originating from different receivers in the network, for example, to determine the presence of Layer 2, Layer 3, and/or Layer 4 packets. In some aspects, traffic types can be identified based on a regularity of packets received from and/or transmitted to a particular receiver. By way of example, a high regularity of packet exchange may indicate a particular traffic flow type, such as, voice over IP (VoIP), which corresponds to transfers associated with a specific packet layer. In VoIP flows, the traffic from the STA can be reliably anticipated since it follows a constant pattern. By delaying the traffic from the AP to the STA until just before the regular transmission from the STA to the AP happens, the traffic can have it's duration field extended to cover the transmissions of VoIP from the STA to the AP, thus avoiding any contention by the STA for this traffic.

In some aspects, the AP can be configured to monitor traffic flows, e.g. using a machine learning model, to identify one or more nodes in the wireless network (e.g. identify a first client device), from which subsequent Layer 3 and/or Layer 4 packets are likely to be received (step 304). In some aspects, the AP can also be configured to predict duration necessary to send a batch of data packets to the first client device, and to subsequently receive one or more Layer 4 acknowledgments (e.g., a batch of TCP ACKs). As discussed above, such predictions can be used by the AP to configure a duration specified in a duration field, and used to prevent wireless contention by other network nodes.

Subsequently, at step 306, a Layer 2 packet is provided to the plurality of client devices (receivers) in the network, which includes the extended duration field value configured in step 304. With the exception of the intended receiving node (e.g., the first client device), receipt of the Layer 2 (RTS) packet by every other node in the network causes the respective receiving nodes to set their virtual carrier sense, and thus to avoid wireless contention for the specified duration. Because the duration is based on an amount of time needed for the AP to complete the reception and 802.11 acknowledgement of all TCP ACKs, a significant amount of wireless contention in the network is avoided.

Figure 4:
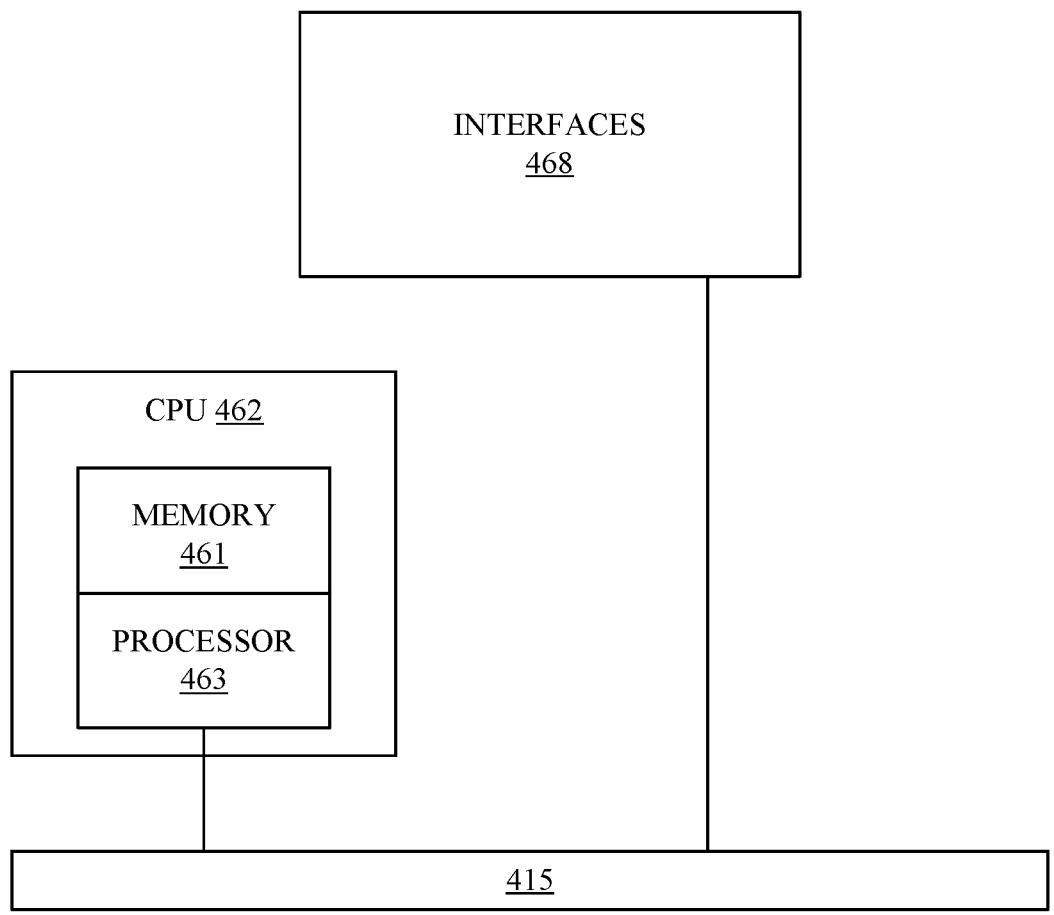
FIG. 4 illustrates example hardware components that can be used to implement an access point (AP), configured in accordance with some aspects of the technology.

FIG. 4 illustrates an example network device 410 that can be used to implement an access point or one or more client devices, as discussed above. Network device 410 includes a master central processing unit (CPU) 462, interfaces 468, and a bus 415 (e.g., a PCI bus). When acting under the control of appropriate software or firmware, the CPU 462 can be configured to carry out a process for reducing contention in a wireless medium, in accordance with some aspects of the technology.

For example, CPU 432 can be configured to facilitate implementation of data packet exchange with a plurality of client devices in a wireless network, and based on the exchange, identify a first device from among a plurality of client devices from which one or more higher-layer packets are likely to be received. In some aspects, CPU 432 can be configured to transmit (e.g., via a transceiver portion of interfaces 468), a packet to a first device, wherein the packet includes an extended duration field value, and is configured to be received by one or more of the plurality of devices and to suppress transmission by the one or more of the plurality of devices until at least one of the higher-layer packets are received from the first device.

The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

Interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The invention claimed is:

1. A method of reducing access contention in a network, the method comprising:
   determining, by a transmitter, a likelihood that a client device will generate one or more TCP ACK packets as a predicted response packet type that will be in response to a data packet transmitted to the client device, wherein the predicted response packet type is predicted based on a model of response types and response durations;
   predicting, by the transmitter, a response time when the predicted response packet type will be received from the client device in response to the data packet transmitted to the client device, wherein the response time is predicted based on the model of response types and response durations;
   determining, based on the predicted response packet type and the response time, an extended duration field value which corresponds to a time duration from a time that the data packet is transmitted until at least a time when a response comprising the predicted response packet type will be received from the client device; and
   transmitting the data packet to the client device, wherein the data packet comprises the extended duration field value, and wherein the data packet transmitted to the client device is configured to suppress transmission by one or more devices other than the client device during the time duration corresponding to the extended duration field value.

2. The method of claim 1, wherein the data packet comprises a Request to Send (RTS) frame formatted based on an 802.11 wireless networking protocol, the RTS frame comprising the extended duration field value.

3. The method of claim 1, wherein the data packet comprising the extended duration field value is further configured to suppress transmission by the one or more devices until a time duration necessary to receive a Clear to Send (CTS) packet, transmit a plurality of data packets to the client device, and receive a plurality of Transmission Control Protocol (TCP) acknowledgement (ACK) packets from the client device.

4. The method of claim 1, further comprising:
   determining the response time further based on a number of data packets to be transmitted to the client device.

5. The method of claim 1, further comprising:
   identifying the client device from a plurality of devices based on a traffic type for one or more packets previously received from the client device to facilitate predictions of the extended duration field value.

6. The method of claim 1, wherein, the response from the client device is in a higher layer of the network than the data packet transmitted by the transmitter.

7. The method of claim 1, wherein determining a likelihood is further based on a frequency of packet exchanges with the client device.

8. A non-transitory computer-readable medium comprising instructions, the instructions, when executed by a computing system, cause the computing system to perform operations for reducing access contention in a network, the operations comprising:
   determining, by a transmitter, a likelihood that a client device will generate one or more TCP ACK packets as a predicted response packet type in response to a data packet transmitted to the client device, wherein the predicted response packet type is predicted based on a model of response types and response durations;
   predicting, by the transmitter, a response time when the predicted response packet type will be received from the client device in response to the data packet transmitted to the client device, wherein the response time is predicted based on the model of response types and response durations;
   determining, based on the predicted response packet type and the response time, an extended duration field value which corresponds to a time duration from a time that the data packet is transmitted until at least a time when a response comprising the predicted response packet type will be received from the client device; and
   transmitting the data packet to the client device, wherein the data packet comprises the extended duration field value, and wherein the data packet transmitted to the client device is configured to suppress transmission by one or more devices other the client device during the time duration corresponding to the extended duration field value.

9. The non-transitory computer-readable medium of claim 8, wherein the data packet comprises a Request to Send (RTS) frame formatted based on an 802.11 wireless networking protocol, the RTS frame comprising the extended duration field value.

10. The non-transitory computer-readable medium of claim 8, wherein the data packet comprising the extended duration field value is further configured to suppress transmission by the one or more devices until a time duration necessary to receive a Clear to Send (CTS) packet, transmit a plurality of data packets to the client device, and receive a plurality of Transmission Control Protocol (TCP) acknowledgement (ACK) packets from the client device.

11. The non-transitory computer-readable medium of claim 8, wherein the operations further comprise:
 determining the response time further based on a number of data packets to be transmitted to the client device.

12. The non-transitory computer-readable medium of claim 8, wherein the operations further comprise:
 identifying the client device from a plurality of devices based on a traffic type for one or more packets previously received from the client device to facilitate predictions of the extended duration field value.

13. The non-transitory computer-readable medium of claim 8, wherein, the response from the client device is in a higher layer of the network than the data packet transmitted by the transmitter.

14. A system comprising:
 a processor; and
 a non-transitory computer-readable medium storing instructions that, when executed by the processor, cause the system to perform operations for reducing access contention in a network, the operations comprising:
 determining, by a transmitter, a likelihood that a client device will generate one or more TCP ACK packets as a predicted response packet type in response to a data packet transmitted to the client device, wherein the predicted response packet type is predicted based on a model of response types and response durations;
 predicting, by the transmitter, a response time when the predicted response packet type will be received from the client device in response to the data packet transmitted to the client device, wherein the response time is predicted based on the model of response types and response durations;
 determining, based on the predicted response packet type and the response time, an extended duration field value which corresponds to a time duration from a time that the data packet is transmitted until at least a time when a response comprising the predicted response packet type will be received from the client device; and
 transmitting the data packet to the client device, wherein the data packet comprises the extended duration field value, and wherein the data packet transmitted to the client device is configured to suppress transmission by one or more devices other the client device during the time duration corresponding to the extended duration field value.

15. The system of claim 14, wherein the data packet comprises a Request to Send (RTS) frame formatted based on an 802.11 wireless networking protocol, the RTS frame comprising the extended duration field value.

16. The system of claim 14, wherein the data packet comprising the extended duration field value is further configured to suppress transmission by the one or more devices until a time duration necessary to receive a Clear to Send (CTS) packet, transmit a plurality of data packets to the client device, and receive a plurality of Transmission Control Protocol (TCP) acknowledgement (ACK) packets from the client device.

17. The system of claim 14, wherein the operations further comprise:
 determining the response time further based on a number of data packets to be transmitted to the client device.

18. The system of claim 14, wherein the operations further comprise:
 identifying the client device from a plurality of devices based on a traffic type for one or more packets previously received from the client device to facilitate predictions of the extended duration field value.

19. The system of claim 14, wherein predicting the predicted response packet type is further based on a frequency of packet exchanges with the client device.

* * * * *